United States Patent
Scott et al.

(10) Patent No.: US 10,310,124 B1
(45) Date of Patent: Jun. 4, 2019

(54) FLOATING VESSEL BASED SYSTEM FOR GENERATING A MULTIDIMENSIONAL SEISMIC DATA SET FOR A TARGET AREA

(71) Applicants: Lawrence Scott, Stafford, TX (US); Edward Majzlik, Stafford, TX (US)

(72) Inventors: Lawrence Scott, Stafford, TX (US); Edward Majzlik, Stafford, TX (US)

(*) Notice: Subject to any disclaimer, the term of this patent is extended or adjusted under 35 U.S.C. 154(b) by 0 days.

(21) Appl. No.: 16/252,246

(22) Filed: Jan. 18, 2019

Related U.S. Application Data

(60) Provisional application No. 62/636,513, filed on Feb. 28, 2018.

(51) Int. Cl.
*G01V 1/38* (2006.01)
*G01V 3/08* (2006.01)

(52) U.S. Cl.
CPC ............ *G01V 1/3808* (2013.01); *G01V 3/081* (2013.01); *G01V 3/082* (2013.01); *G01V 3/083* (2013.01); *G01V 2003/084* (2013.01); *G01V 2210/1293* (2013.01); *G01V 2210/1423* (2013.01)

(58) Field of Classification Search
None
See application file for complete search history.

(56) References Cited

U.S. PATENT DOCUMENTS

| | | | | |
|---|---|---|---|---|
| 5,995,445 A * | 11/1999 | Whitesell | ................ | G01S 3/801 367/129 |
| 6,285,956 B1 * | 9/2001 | Bennett | ................... | B63B 21/66 702/14 |
| 8,351,293 B2 * | 1/2013 | Frivik | ...................... | G01V 1/38 181/110 |
| 8,792,298 B2 * | 7/2014 | Toennessen | ............ | B63B 21/66 114/249 |
| 9,910,175 B1 * | 3/2018 | Majzlik | ..................... | G01V 1/30 |
| 2002/0161525 A1 * | 10/2002 | Wisecup | .................. | G01V 1/28 702/14 |
| 2011/0066380 A1 * | 3/2011 | Hager | ................. | E21B 41/0064 702/8 |
| 2011/0295510 A1 * | 12/2011 | Gulati | ...................... | G01V 1/28 702/16 |
| 2013/0039148 A1 * | 2/2013 | Langeland | ........... | G01V 1/3861 367/16 |
| 2013/0114373 A1 * | 5/2013 | Mandroux | ............... | G01V 1/02 367/16 |

(Continued)

*Primary Examiner* — Isam A Alsomiri
*Assistant Examiner* — Jonathan D Armstrong
(74) *Attorney, Agent, or Firm* — Buskop Law Group, P.C.; Wendy Buskop

(57) ABSTRACT

A floating vessel based system generates a multidimensional seismic data set for a target area. The floating vessel based system includes a seismic source proximate to a floating vessel, providing a plurality of seismic energy pulses through water to the target area forming a plurality of reflected seismic energy pulses, a non-stationary seismic node configured for being towed from the floating vessel using at least one rope through the water, a non-stationary seismic node, and a second processor with second data storage on the floating vessel. The second data storage instructs the second processor to receive, each digital data series, combines the digital data series for all non-stationary seismic nodes utilized, and automatically generates multidimensional seismic data set for the target area.

19 Claims, 9 Drawing Sheets

Node and sensor configuration and inline/crossline ratio table

| Configuration | Sample rate(ms) | Frequency range(Hz) | Number nodes | Sensors/ node | Samples/ day (million) | Sensor inline spacing (m) | Sensor crossline spacing (m) | Spatial resolution (inline(m) x crossline(m)) | Inline/ crossline sensor spacing ratio |
|---|---|---|---|---|---|---|---|---|---|
| Control | 1 | 1-500 | 10 | 8 | 6.912 | 12.5 | 6.25 | 6.25 x 3.125 | 1:2 |
| 1 | 0.1 | 1-10000 | 2 | 2 | 3,456 | 0.1 | 3.125 | 0.05 x 1.5625 | 31:1 |
| 2 | 0.1 | 1-10000 | 10 | 8 | 69,120 | 25 | 25 | 12.5 x 12.5 | 1:1 |
| 3 | 0.5 | 1-2000 | 2 | 8 | 2,765 | 6.25 | 12.5 | 3.125 x 6.25 | 2:1 |
| 4 | 1 | 1-500 | 10 | 100 | 86,400 | 12.5 | 0.1 | 6.25 x 0.05 | 1:125 |

(56) References Cited

U.S. PATENT DOCUMENTS

| | | | |
|---|---|---|---|
| 2014/0078862 A1* | 3/2014 | Guevel | B63B 21/66 367/17 |
| 2014/0233350 A1* | 8/2014 | Stokkeland | G01V 1/3808 367/15 |
| 2014/0269169 A1* | 9/2014 | van Borselen | G01V 1/3861 367/15 |
| 2015/0078123 A1* | 3/2015 | Batcheller | G01S 17/89 367/7 |
| 2016/0041266 A1* | 2/2016 | Smits | G01S 17/66 356/5.01 |
| 2016/0139284 A1* | 5/2016 | Meech | G05D 1/0206 367/14 |
| 2017/0074088 A1* | 3/2017 | Farrington | G01V 1/001 |
| 2017/0074998 A1* | 3/2017 | McColpin | G01V 1/40 |
| 2017/0074999 A1* | 3/2017 | Walters | G01V 1/30 |
| 2017/0075001 A1* | 3/2017 | McColpin | G01V 1/303 |
| 2017/0075002 A1* | 3/2017 | Ranjan | G01V 1/303 |
| 2017/0075004 A1* | 3/2017 | McColpin | G01V 1/303 |
| 2017/0075005 A1* | 3/2017 | Ranjan | G01V 1/303 |
| 2017/0075006 A1* | 3/2017 | Dusterhoft | G01V 1/303 |
| 2017/0075007 A1* | 3/2017 | Walters | G01V 1/306 |
| 2017/0090053 A1* | 3/2017 | Eick | G01V 1/302 |
| 2017/0108605 A1* | 4/2017 | Walters | G01V 1/303 |
| 2017/0123089 A1* | 5/2017 | Walters | E21B 43/26 |
| 2017/0184749 A1* | 6/2017 | McKey, III | B63B 21/66 |
| 2018/0217285 A1* | 8/2018 | Walters | G01V 1/303 |

* cited by examiner

Power and data usage table

| Sample rate (ms) | Power consumption (W) | Date storage requirement/day (MB) | Power required for 30 day deployment (kWh) | Data Storage required per 30 day deployment (MB) |
|---|---|---|---|---|
| 0.1 | 2.0 | 86,400 | 1.44 | 2,592,000 |
| 0.5 | 1.5 | 1,728 | 1.08 | 51,840 |
| 1 | 1.0 | 864 | 0.72 | 25,920 |
| 2 | 0.5 | 432 | 0.36 | 12,960 |

FIG. 7

Node and sensor configuration and inline/crossline ratio table

| Configu-ration | Sample rate(ms) | Frequency range(Hz) | Number nodes | Sensors/ node | Samples/ day (million) | Sensor inline spacing (m) | Sensor crossline spacing (m) | Spatial resolution (inline(m) × crossline(m)) | Inline/ crossline sensor spacing ratio |
|---|---|---|---|---|---|---|---|---|---|
| Control | 1 | 1-500 | 10 | 8 | 6,912 | 12.5 | 6.25 | 6.25 × 3.125 | 1:2 |
| 1 | 0.1 | 1-10000 | 2 | 2 | 3,456 | 0.1 | 3.125 | 0.05 × 1.5625 | 31:1 |
| 2 | 0.1 | 1-10000 | 10 | 8 | 69,120 | 25 | 25 | 12.5 × 12.5 | 1:1 |
| 3 | 0.5 | 1-2000 | 2 | 8 | 2,765 | 6.25 | 12.5 | 3.125 × 6.25 | 2:1 |
| 4 | 1 | 1-500 | 10 | 100 | 86,400 | 12.5 | 0.1 | 6.25 × 0.05 | 1:125 |

FIG. 8

FLOATING VESSEL BASED SYSTEM FOR GENERATING A MULTIDIMENSIONAL SEISMIC DATA SET FOR A TARGET AREA

CROSS REFERENCE TO RELATED APPLICATIONS

The present application claims priority to and the benefit of U.S. Provisional Patent Application Ser. No. 62/636,513 filed on Feb. 28, 2018, entitled "FLOATING VESSEL BASED SYSTEM FOR GENERATING A MULTIDIMENSIONAL SEISMIC DATA SET FOR A TARGET AREA.". These references are hereby incorporated in its entirety.

FIELD

The present embodiment generally relates to floating vessel based system for generating a multidimensional seismic data set for a target area.

BACKGROUND

A need exists for a floating vessel based system for generating a multidimensional seismic data set for a target area.

The present embodiments meet these needs.

BRIEF DESCRIPTION OF THE DRAWINGS

The detailed description will be better understood in conjunction with the accompanying drawings as follows:

FIG. 7 depicts a Power and Data Usage Table.

FIG. 8 depicts a Node and Sensor Configuration and Inline/Crossline Ratio Table.

Figure 1:
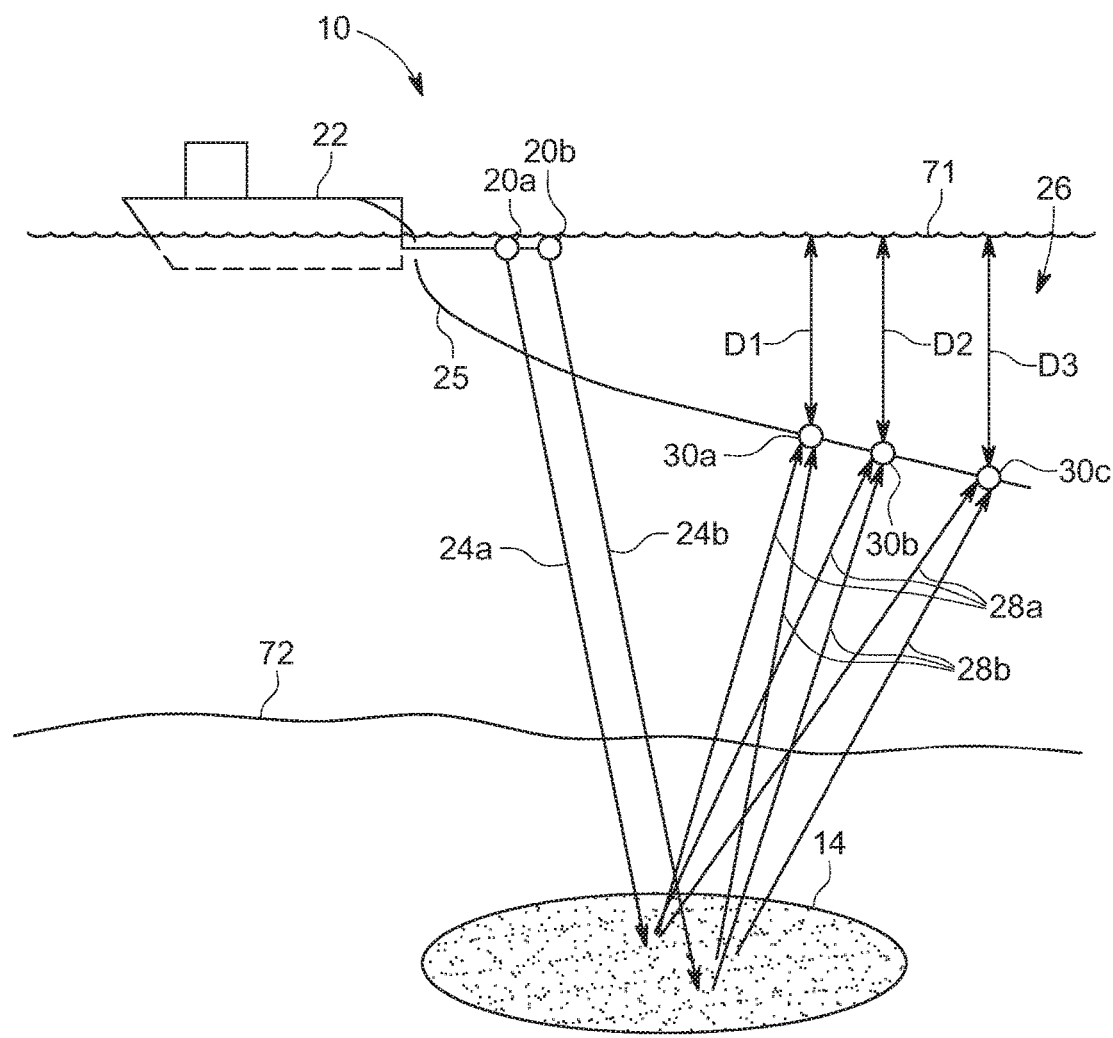
FIG. 1 depicts a side view of a floating vessel with the floating vessel based system for generating a multidimensional seismic data set for a target area.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The embodiments prevent death by no longer requiring workers in a dingy to enter dangerous waters, such water having 3 to 5 foot waves, to repair a broken seismic streamer in order to continuously collect seismic data.

The embodiments will be 30-40% less expensive than current seismic streamers, because there are no power or electrical connections from the seismic node to the floating vessel. Additionally the cost for a large nodal array, 16 cables each 6000 meters long with a seismic node every 12.5 meters=7680 channels, is less than ½ the cost of comparable conventional seismic streamer acquisition system.

The embodiments provide increased flexibility to seismic data collection because the unique non-stationary seismic nodes are simply attached to a rope. This attaching means enables the recording spread to be re-adjustable and reconfigurable between adjacent seismic nodes.

Casualties are prevented with this system by requiring fewer people on the floating vessel. Fewer crew members are needed; therefore, the number of individuals exposed to open ocean and hurricanes is reduced, because seismic data is reviewed only after seismic nodes are retrieved from the water into the floating vessel, which provides a safer work environment.

Productivity of the crew is improved with this system, because there is no need for trouble shooting in water equipment, thereby reducing environmental impact of the floating vessel, such as reducing fuel consumed.

The following terms are used herein:

The term "accelerometer sensor" refers to a device for measuring acceleration.

The term "a single axis accelerometer" refers to a seismic sensor that performs as a accelerometer sensor configured to measure vertical acceleration.

The term "two axis accelerometer" refers to a seismic sensor that performs as an accelerometer sensor configured to measure vertical and crossline acceleration.

The term "three axis accelerometer" refers to a seismic sensor that performs as an accelerometer sensor configured to measure vertical, inline, and crossline acceleration.

The term "connector" as used herein refers to an electrical connector to receive and transfer data having a signal input and a signal output in a waterproof configuration.

The term "depth indicator" refers to a pressure sensor that measures ambient pressure around the non-stationary seismic node in real time.

The term "hydrodynamic body providing horizontal and vertical profiles" refers to a body which can be a cylindrical body that is neutrally buoyant and allows the body to be towed through water with reduces resistance due to the shape of the body. In examples, the body can be 1 foot to 8000 feet long and from 1 and 12 inches in diameter. In an embodiment, the hydrodynamic body can be a 1 to 3 foot long rigid member attached to a flexible component with hundreds or thousands of hydrophones (seismic sensors) that will be up to 2400 meters long, equivalent to approximately 8000 feet.

The term "hydrophone" refers to a seismic sensor that performs as a pressure sensor for listening to sound transmitted through water.

The term "local gravitational field" refers to the acceleration that is imparted to objects due to the distribution of mass within the earth at a specific geographic location.

The term "mounted on" can refer to mounted on, or mounted within or mounted penetrating from the waterproof housing.

The term "reflected seismic energy pulses" refers to seismic signals which traveled through the earth and reflected off of geologic formations within the target area.

The term "rope" as used herein refers to a long thin non-electrical material made of nylon, hemp, natural fiber, polymer, created to resist stretching and retain basic shape up to +5% of the original length. Additionally, the term rope is used herein to be equivalent to the nautical term "line". A "line" in the nautical world has one end affixed to a floating vessel. Ropes used in this application are affixed on one end to a floating vessel for the seismic array.

The term "seismic source" refers to a mechanical device that produces an acoustic signal that can move through a body of water from a depth of 2 feet to 30,000 feet and be reflected back to the surface of the body of water. Some seismic sources are compressed air sources, others are mechanical vibrators. Another type of seismic source is an electrical sparker.

The term "target area" refers to a geographic location with subsurface geologic formations of interest.

Turning now to the Figures, FIG. 1 depicts a side view of a floating vessel 22 with the floating vessel based system for generating a multidimensional seismic data set for a target geological marine area.

A floating vessel based system 10 for generating a multidimensional seismic data set for a target area 14 is shown.

A floating vessel 22 is shown in water 26.

The floating vessel 22 is shown towing a pair of seismic sources 20a and 20b in the water near the water surface 71.

The seismic sources 20a and 20b provide a plurality of seismic energy pulses 24a and 24b, which are shown passing through water 26 to the target area 14 below the sea floor 72 forming a plurality of reflected seismic energy pulses 28a and 28b.

In embodiments, wherein the seismic source is located on the floating vessel, on a second source floating vessel, or towed from the floating vessel, or towed from the second source floating vessel.

In embodiments, a plurality of seismic sources can be towed by the floating vessel.

Three non-stationary seismic nodes are depicted as 30a-30c.

Each non-stationary seismic node is configured for being towed (in this figure) at a different depths through the water, with a depth represented as D1 for non-stationary seismic node 30a, D2 for non-stationary seismic node 30b and D3 for non-stationary seismic node 30c. The floating vessel based system contemplates that the floating vessel tows a plurality of non-stationary seismic nodes at a plurality of depths D1, D2, D3, below a water surface 71 simultaneously.

Each of the nonstationary seismic nodes is towed from the floating vessel 22 using at least one rope. Rope 25 is shown towing all three non-stationary seismic nodes in parallel through the water 26.

Figure 2:
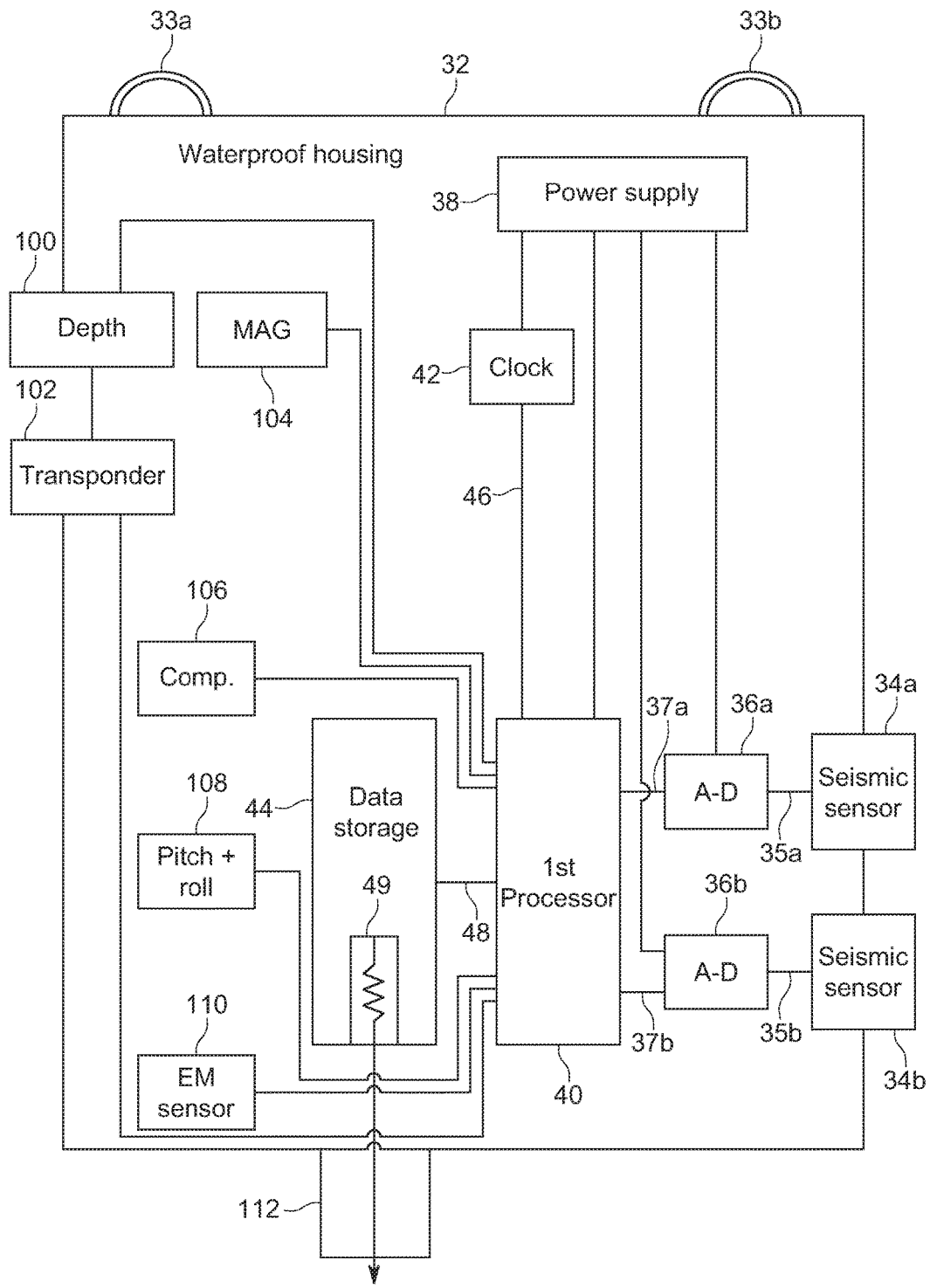
FIG. 2 shows an embodiment of one of the non-stationary seismic nodes.

FIG. 2 shows an embodiment of a non-stationary seismic nodes 30.

The non-stationary seismic node can include a water proof housing 32 which can be a hydrodynamic body providing horizontal and vertical profiles adapted to capture acoustic or seismic energy.

The waterproof housing 32 can have one or more connectors. One connector 112 is shown in this figure.

The water proof housing 32 can have one or two fasteners 33ab for engaging one or more ropes 25.

Inside the waterproof housing or penetrating the waterproof housing are two seismic sensors 34a and 34b. Each seismic sensor is electrically connected to an analog to digital converters and configured to receive reflected seismic energy pulses 28 through the water 26.

Each seismic sensor 34a and 34b forms an analog signals 35a and 35b.

Embodiments contemplates that the plurality of seismic sensors can be are mounted on the water proof housing.

Each analog to digital converter 36a and 36b connects in parallel to a seismic sensor 34a and 34b respectively. Each analog to digital converter 36a and 36b converts the analog signals 35a and 35b to digital values 37a and 37b.

In embodiments, each of the analog to digital converters can be connected to a seismic sensor 34ab, each analog to digital converter converting one of the analog signals to a digital value.

A power supply 38 electrically connects to each analog to digital converter 36.

The power supply can be a DC voltage source having a range from 3 volts to 24 volts.

The power supply can be replaceable or rechargeable.

A first processor 40 connects electronically to both analog to digital converters 36a and 36b.

The first processor 40 also connects electrically to a power supply 38.

A high precision clock 42 electronically connects between and to the first processor 40 and to the power supply 38.

The high precision clock 42 provides a time stamp 46 to the first processor. The time stamp 46 is installed on collected digital values 37a, and 37b as they occur forming a multidimensional marine seismic record 48 for each digital value 37a or 37b.

A data storage 44 is in communication with the first processor 40.

Figure 9:
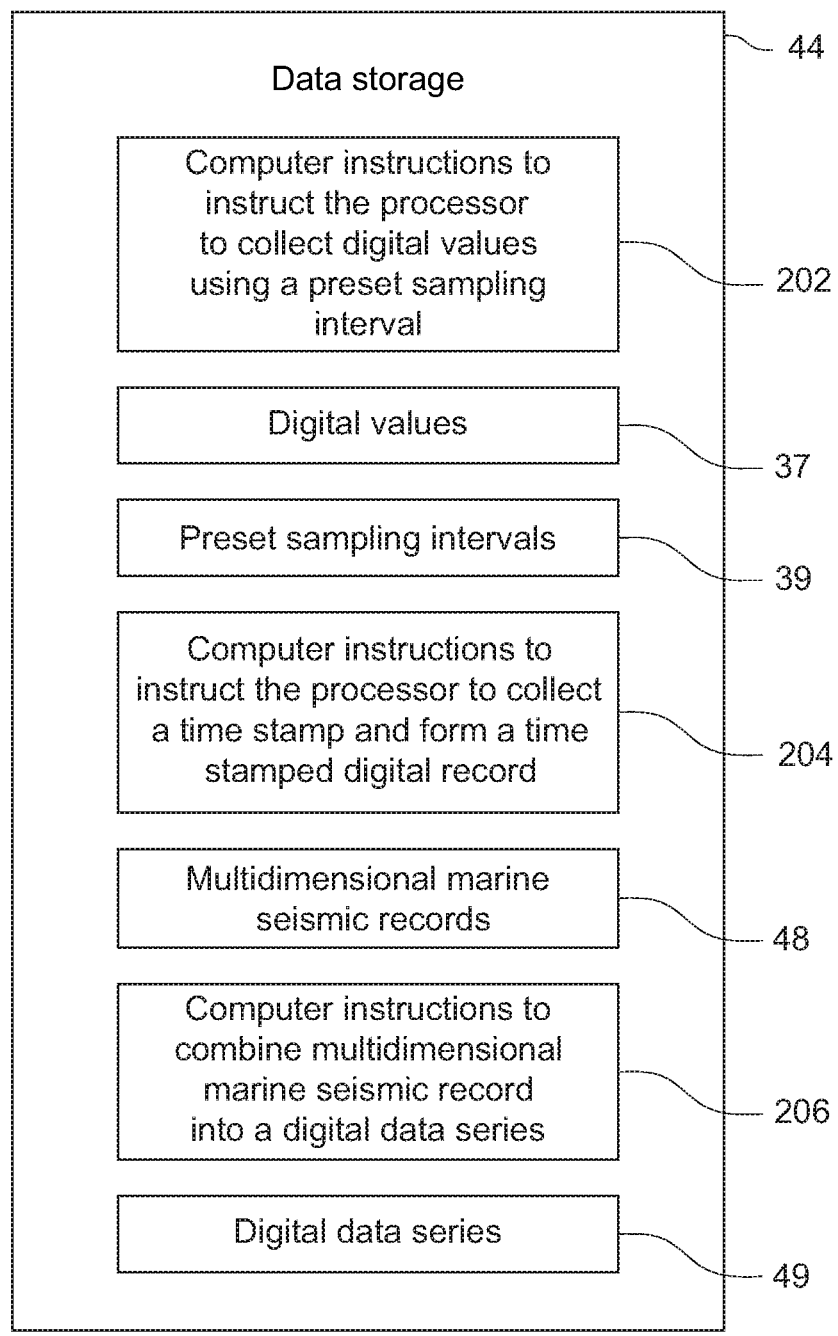
FIG. 9 depicts data storage of the first processor.

Data storage 44 connected to the first processor 40, contains computer instructions to instruct the first processor (i) to collect digital values 37 from the analog to digital converters using a preset sampling interval between 0.1 milliseconds and 2 milliseconds (ii) to provide a time stamp 46 forming a multidimensional marine seismic record 48, (iii) to store the multidimensional marine seismic records in the data storage, (iv) to combine a plurality of multidimensional marine seismic records 48 into a digital data series 49 and save in the data storage. FIG. 9 provides the details of data storage 44.

The multidimensional marine seismic record can generated at sampling intervals from 0.05 milliseconds and 4 milliseconds The non-stationary seismic node 30 includes a connector 112 for transferring the digital data series 49 to a second processor.

FIG. 2 shows optional components of each non-stationary seismic node 30.

It should be noted that the seismic sensor of each non-stationary seismic node is selected from the group consisting of: a hydrophone, a single axis accelerometer, a two axis accelerometer, and a three axis accelerometer.

A depth indicator 100 can be included performing as a sensor to measure the depth of the non-stationary seismic node 30 in a water.

An acoustic transponder 102 for communicating reflected pulses from the floating vessel or a towed buoy with the first processor.

The non-stationary seismic node can include a magnetometer 104 for measuring magnetic field intensity of the target area and communicating measured magnetic field intensity with the first processor.

The non-stationary seismic node can include a magnetic compass 106 for measuring orientation of the non-stationary seismic node with respect to a preset magnetic heading and communicating the measured orientation with the first processor.

The non-stationary seismic node can include a pitch and roll attitude sensor 108 for measuring orientation of the non-stationary seismic node relative to a local gravitational field and communicating the measured orientation with the first processor.

The non-stationary seismic node can include an electromagnetic sensor 110 for measuring magneto-telluric or controlled source electromagnetic signals and communicating the measured electromagnetic signals with the first processor.

Figure 3:
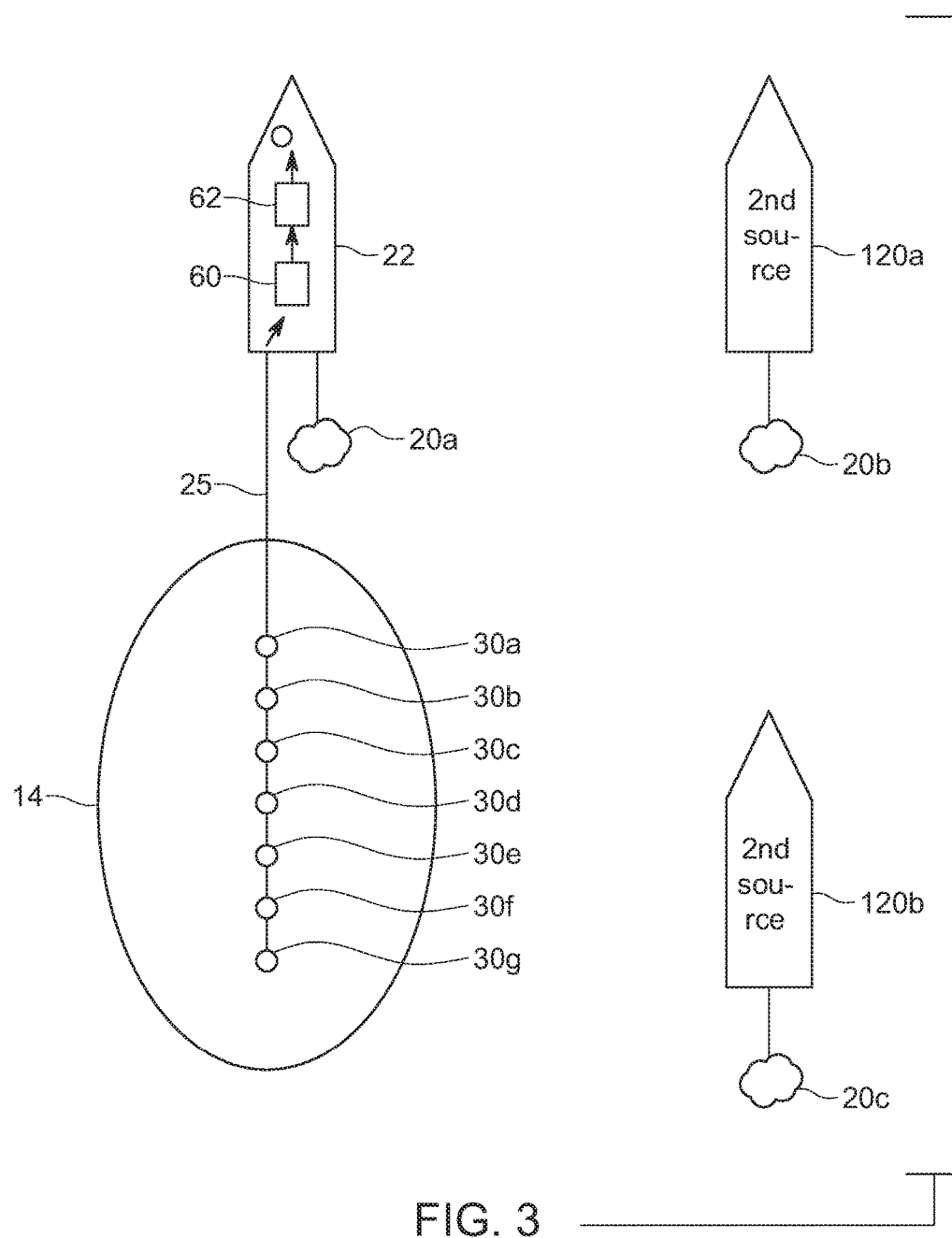
FIG. 3 is a top view of a floating vessel with a plurality of second source floating vessels and the floating vessel based system.

FIG. 3 depicts additional details of the system. FIG. 3 is a top view of a floating vessel with a plurality of second source floating vessels 120a and 120b of the floating vessel base system. Each of the second source floating vessels has an seismic source shown as 20b and 20c respectively.

On the floating vessel 22 is a second processor 60 with a second data storage 62 on the floating vessel.

It should be noted that in embodiments, the first and second processor can be computers or microcomputers, microprocessor or microcontrollers.

The first and second data storage can be non-evanescent memory that can store machine readable instructions instructing the processor to perform a computation.

Figure 10:
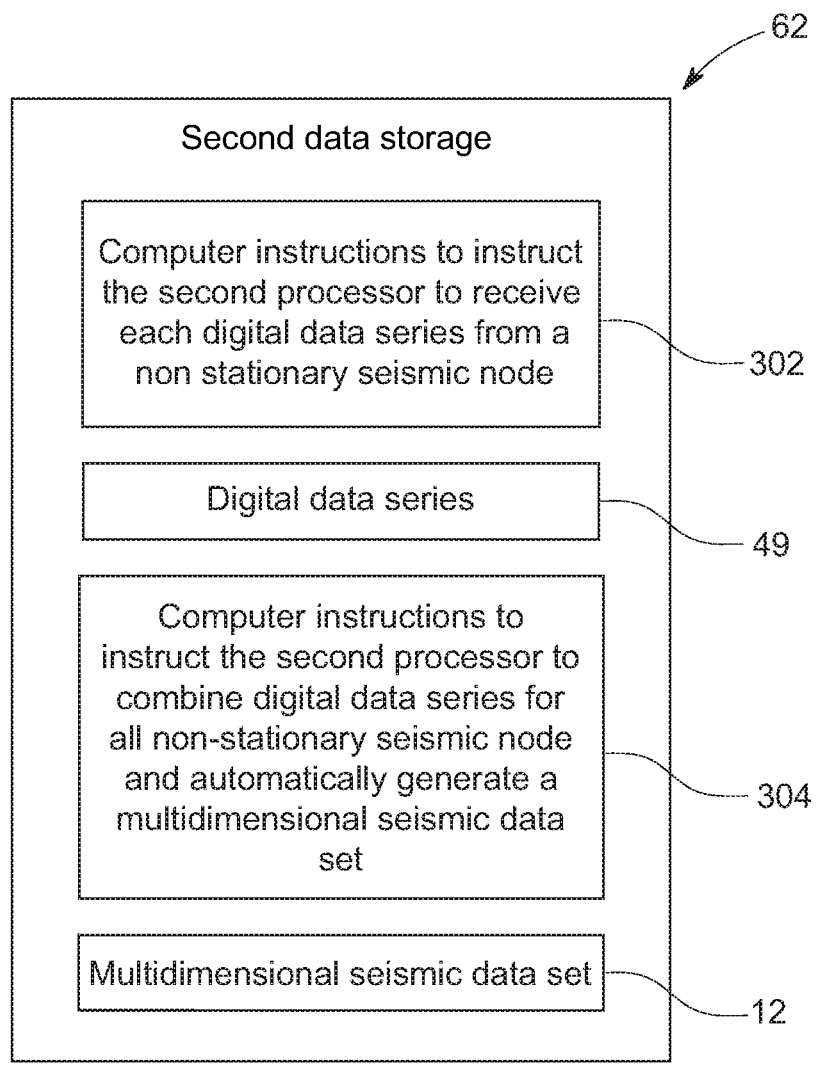
FIG. 10 depicts data storage of the second processor.

More specifically, the second data storage 62 (as shown in FIG. 10) has computer instructions 302 to instruct the second processor to receive, each digital data series 49 from a non-stationary seismic node.

The second data storage stores each digital data series 49 (as shown in FIG. 10)

The second data storage also has computer instructions 304 to instruct the second processor to combine the digital data series 49 for all non-stationary seismic nodes and automatically generate a single multidimensional seismic data set 12 for the target area 14.

In embodiments, the multidimensional seismic data set 12 has three dimensions, x, y and z.

The multidimensional seismic data set 12 for the target area 14 has a spatial resolution from 0.05 meter to 12.5 meter and a temporal resolution from 100 microseconds to 2 milliseconds.

In embodiments, the vessel 22 is depicted over the target area 14 towing by rope 25 non-stationary seismic sensors 30a-30g which are aligned along the rope 25 to each other.

Returning to FIG. 3, the floating vessel 22 is shown towing a seismic source 20a.

The seismic source 20a provides a plurality of seismic energy pulses through water to the target area 14 and a plurality of reflected seismic energy pulses reflect back to the floating vessel from the target area.

Two different second source floating vessels 120a and 120b are shown. Each second source floating vessel is towing a seismic source shown as 20b for second source floating vessel 120a and 20c for second source floating vessel 120b.

Figure 4:
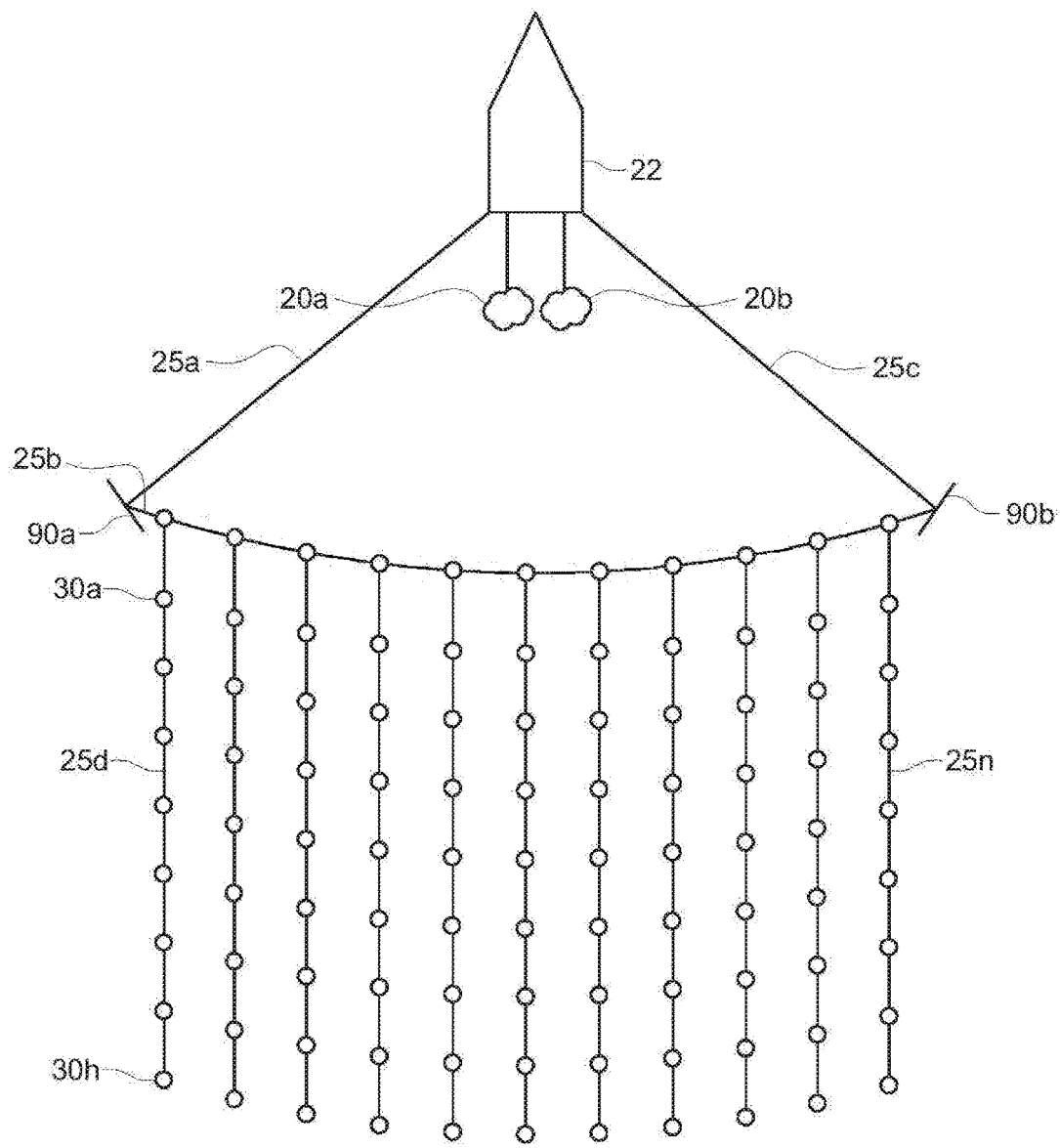
FIG. 4 is top view of another embodiment of a floating vessel with the floating vessel based system.

FIG. 4 is top view of another embodiment of a floating vessel 22 with the floating vessel based system.

Ropes 25a, 25b and 25c are deployed from the floating vessel 22.

Two seismic sources 20a and 20b are towed by the floating vessel 22.

A pair of diverters 90a and 90b are shown positioned between ropes.

Diverter 90a is between ropes 25a and 25b. Diverter 90b is shown between ropes 25c and 25b.

Ropes 25d-25n are shown attached to and extending from rope 25b.

Attached to each rope 25d to 25n are a plurality of aligned non-stationary seismic nodes 30a-30h. For example, rope 25d has non-stationary seismic nodes 30a-30h. Each additional rope is shown with the same number of non-stationary seismic nodes, with each pair of non-stationary seismic nodes being separated by an equivalent distance.

11 ropes with seismic nodes are shown for a total of 88 seismic nodes.

In embodiments of the floating vessel based system it should be noted that at least one seismic sensor is selected from the group consisting of: a hydrophone, a single axis accelerometer, a two axis accelerometer, and a three axis accelerometer.

Figure 5:
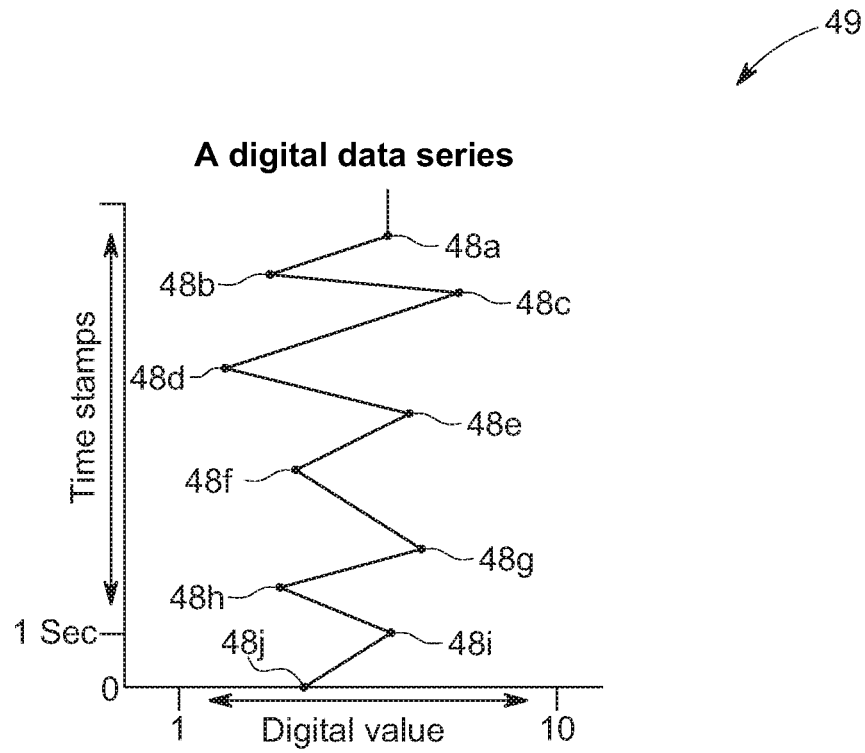
FIG. 5 is a diagram of the digital data series produced by the non-stationary seismic node.

FIG. 5 depicts a diagram of one digital data series 49 plotted against time stamps on the y axis and digital values plotted on the x axis. The digital data series 49 is produced by one non-stationary seismic node that generated many multidimensional marine seismic records 48a-48j. The first processor in the non-stationary seismic node used computer instructions in the data storage to combine multidimensional marine seismic records 48a-48j into the digital data series 49 shown in FIG. 6.

Figure 6:
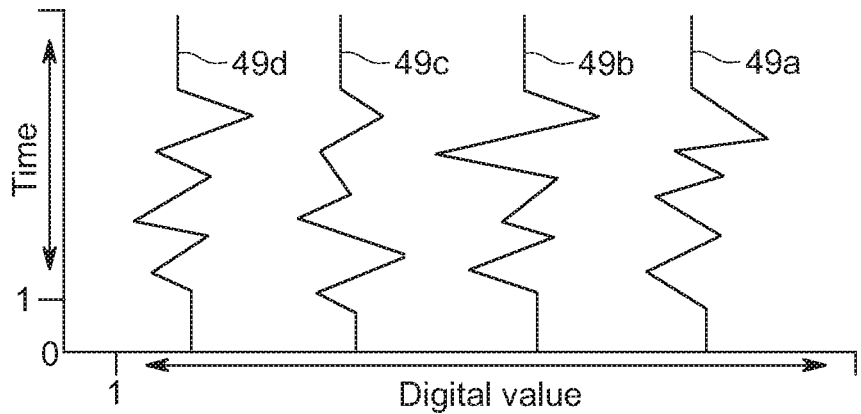
FIG. 6 is a diagram of a multidimensional records produced according to embodiments herein.

FIG. 6 is a diagram of a multidimensional seismic data set produced according to embodiments herein.

The second processor receives the individual digital data series 49a, 49b, 49c, and 49d and plots them together on a graph of time on the y axis and digital values on the x axis.

FIG. 7 depicts a Power and Data Usage Table according to the system.

When the Sample Rate is at 0.1 ms, the Power consumption is at 2.0 W, the Data Storage Requirement is at 86,400 MB per day, the Power required for 30 day deployment is 1.44 kWh, and the Data Storage Required per 30 day development per channel is 2,592,000 MB.

When the Sample Rate is at 0.5 ms, the Power consumption is at 1.5 W, the Data Storage Requirement is at 1,728 MB per day, the Power Required for 30 day deployment is 1.08 kWh, and the Data Storage Required per 30 day development per When the Sample Rate is at 1 ms, the Power consumption is at 1.0 W, the Data Storage Requirement is at 864 MB per day, the Power Required for 30 day deployment is 0.72 kWh, and the Data Storage Required per 30 day development per channel is 25,920 MB.

When the Sample Rate is at 2 ms, the Power consumption is at 0.5 W, the Data Storage Requirement is at 432 MB per day, the Power Required for 30 day deployment is 0.36 kWh, and the Data Storage Required per 30 day development per channel is 12,960 MB.

FIG. 8 depicts a Node and Sensor Configuration and Inline/Crossline Ratio Table.

When the Configuration is 1, the Sample Rate is 0.1 ms, the Frequency Range is 1-10,000 Hz, the number of Nodes is 2, the ratio of Sensors to Nodes is 2, the Samples per Day is 3,456 million, the Sensor Inline Spacing is 0.1 meters, the Sensor Crossline Spacing is 3.125 meters, the Spatial Resolution (which is the Inlines times the crossline) is 0.05× 1.5625 meters, and the Inline to Crossline Sensor Spacing Ratio is 31:1.

When the Configuration is 2, the Sample Rate is 0.1 ms, the Frequency Range is 1-10,000 Hz, the number of Nodes is 10, the ratio of Sensors to Nodes is 8, the Samples per Day is 69,120 million, the Sensor Inline Spacing is 25 meters, the Sensor Crossline Spacing is 25 meters, the Spatial Resolution (which is the Inlines times the crossline) is 12.5×12.5 meters, and the Inline to Crossline Sensor Spacing Ratio is 1:1.

When the Configuration is 3, the Sample Rate is 0.5 ms, the Frequency Range is 1-2,000 Hz, the number of Nodes is 2, the ratio of Sensors to Nodes is 8, the Samples per Day is 2,765 million, the Sensor Inline Spacing is 6.25 meters, the Sensor Crossline Spacing is 12.5 meters, the Spatial Resolution (which is the Inlines times the crossline) is 3.125×6.25 meters, and the Inline to Crossline Sensor Spacing Ratio is 2:1.

When the Configuration is 4, the Sample Rate is 1 ms, the Frequency Range is 1-500 Hz, the number of Nodes is 10, the ratio of Sensors to Nodes is 100, the Samples per Day is 86,400 million, the Sensor Inline Spacing is 12.5 meters, the Sensor Crossline Spacing is 0.1 meters, the Spatial Resolution (which is the Inlines times the crossline) is 6.25×0.05 meters, and the Inline to Crossline Sensor Spacing Ratio is 1:125.

FIG. 9 shows data storage 44 for the first processor.

The data storage 44 connected to the first processor 40, contains computer instructions 202 to instruct the first processor to collect digital values from the analog to digital converters using a preset sampling interval between 0.1 milliseconds and 2 milliseconds.

Digital values 37 are stored in the data storage 44.

Preset sampling intervals 39 are stored in the data storage 44.

The data storage 44 has computer instructions 204 to instruct the processor to provide a time stamp and form a multidimensional marine seismic record.

Multidimensional marine seismic records 48 are stored in the data storage.

Computer instructions 206 instruct the first processor to provide to combine a plurality of multidimensional marine seismic records into a digital data series.

The digital data series 49 is saved in the data storage;

FIG. 10 explains the second data storage 62.

The second data storage saves the digital data series 49 and the multidimensional seismic data set 12.

In addition, the second data storage has computer instructions 302 to instruct the second processor to receive each digital data series from a non-stationary seismic node.

The second data storage has computer instructions 304 to instruct the second processor to combine digital data series for all non-stationary seismic nodes and automatically generate a single multidimensional seismic data set with very high resolution.

EXAMPLE

In this example, a floating vessel based system is installed on a platform supply vessel known as the "Larry-Amie" that has a LOA of 60 meters, 10 meter beam and 5 meter draft.

The system is used for generating the multidimensional seismic data set having 3 dimensions (x, y and z) for a target area such as a 300 square kilometer area in the Gulf of Mexico offshore Texas.

In this example, the floating vessel based system has 2 seismic sources with both seismic sources towed behind the Larry-Amie floating vessel 22.

In this example, the seismic sources are towed side by side parallel to each other.

Each seismic source is an air gun array providing 2000 psi compressed air energy bursts and a volume of 80 cubic inches per energy burst.

Each seismic source of this example provides seismic energy pulses (bursts) every 3 seconds through sea water of the Gulf of Mexico as the Larry-Amie moves at 4 knots. The seismic energy pulses move in multiple directions simultaneously as the Larry-Amie moves through the water forming a plurality of reflected seismic energy pulses which are detected by 16 rows each having 100 neutrally buoyant non-stationary seismic nodes being towed by the Larry-Amie using 16 different ropes through the water 26, In this Example, each non-stationary seismic node has 2 analog to digital converters. Each non-stationary seismic node of this example has 2 seismic sensors with each seismic sensor electrically connected to one of the analog to digital converters and each seismic sensor configured to receive reflected seismic energy pulses through the water.

In this example the first seismic sensor of each non-stationary seismic node is a hydrophone and the second seismic sensor is a three axis accelerometer.

A power supply which is a battery in this Example, of 12 volts, is connected to each analog to digital converter.

A first processor, which in this example, is a microprocessor, is electrically connected to the power supply and electronically connected to both of the analog to digital converters.

A high precision clock that records time to 1 microsecond is electronically connected to the first processor and electrically connected to the power supply.

A data storage having 128 gigabytes of memory is connected to the first processor.

The data storage has computer instructions to instruct the first processor to collect digital values from the analog to digital converter with a sampling interval of 0.5 milliseconds and provide a time stamp with date, hour, minute, second and to 0.5 millisecond forming a digital data series.

It is contemplated that the multidimensional record is formed from the digital data series recorded by a plurality of non-stationary seismic nodes with each seismic pulse from the seismic source.

A second processor with a second data storage is also mounted to the Larry-Amie which is a laptop computer, such as those made by Dell or Apple in 2018.

The second data storage of this second processor contains computer instructions to instruct the second processor to receive each digital data series from a plurality of first processors, and then combine each digital data series for all non-stationary seismic nodes utilized, and automatically generating a single final aggregated multidimensional seismic data set for the target area. For this Example the multidimension seismic data set is comprised of 1600 digital data series containing digital records of the reflected seismic energy pulses for the 300 square kilometer target area. Aggregated for the purpose of this invention means taking the digital data from the plurality nodes and combining them into a single dataset.

The single, final, aggregated multidimensional seismic data set for the target area measured by the Larry-Amie has a horizontal spatial resolution of 1 meter and a temporal resolution of 500 microseconds.

While these embodiments have been described with emphasis on the embodiments, it should be understood that within the scope of the appended claims, the embodiments might be practiced other than as specifically described herein.

What is claimed is:

1. A floating vessel based system for generating a multi-dimensional seismic data set for a target area under water, the floating vessel based system comprising:
    a. a plurality of seismic sources proximate to a floating vessel, providing a plurality of seismic energy pulses through water to the target area forming a plurality of reflected seismic energy pulses;
    b. a plurality of neutrally buoyant non-stationary seismic nodes each configured for towing through water using at least one rope, each non-stationary seismic node comprising:
        (i) a plurality of analog to digital converters;

(ii) a plurality of seismic sensors, each seismic sensor electrically connected to one of the analog to digital converters and configured to receive reflected seismic energy pulses through the water;

(iii) a power supply electrically connects to each analog to digital converter;

(iv) a first processor electrically connects to the power supply and electronically connects to the analog to digital converter;

(v) a high precision clock electronically connected to the first processor and electrically connected to the power supply;

(vi) a data storage connected to the first processor, contains computer instructions to instruct the first processor (i) to collect digital values from the analog to digital converters using a preset sampling interval between 0.1 milliseconds and 2 milliseconds (ii) to provide a time stamp forming a multidimensional marine seismic record, (iii) to store the multidimensional marine seismic records in the data storage, (iv) to combine a plurality of multidimensional marine seismic records into a digital data series and save in the data storage; and c. a second processor with second data storage on the floating vessel, the second data storage instructing the second processor to receive, each digital data series combining the digital data series for all non-stationary seismic nodes and automatically generate a multidimensional seismic data set for the target area, wherein the multidimensional seismic data set for the target area has a spatial resolution from 0.05 meter to 12.5 meter and a temporal resolution from 100 microsecond to 2 milliseconds.

2. The floating vessel based system of claim 1, wherein the seismic sensor is selected from the group consisting of: a hydrophone, a single axis accelerometer, a two axis accelerometer, and a three axis accelerometer.

3. The floating vessel based system of claim 1, wherein the non-stationary seismic node comprises: a depth indicator performing as a sensor to measure the depth of the non-stationary seismic node in a water.

4. The floating vessel based system of claim 1, wherein the non-stationary seismic node comprises: an acoustic transponder for communicating reflected pulses from the floating vessel or a towed buoy with the first processor.

5. The floating vessel based system of claim 1, wherein the non-stationary seismic node comprises: a magnetometer for measuring magnetic field intensity of the target area and communicating measured magnetic field intensity with the first processor.

6. The floating vessel based system of claim 1, wherein the non-stationary seismic node comprises: a magnetic compass for measuring orientation of the non-stationary seismic node with respect to a preset magnetic heading and communicating the measured orientation with the first processor.

7. The floating vessel based system of claim 1, wherein the non-stationary seismic node comprises: a pitch and roll attitude sensor for measuring orientation of the non-stationary seismic node relative to a local gravitational field and communicating the measured orientation with the first processor.

8. The floating vessel based system of claim 1, wherein the non-stationary seismic node comprises: an electromagnetic sensor for measuring magneto-telluric or controlled source electromagnetic signals and communicating the measured electromagnetic signals with the first processor.

9. The floating vessel based system of claim 1, wherein the non-stationary seismic node comprises a connector for transferring the digital data series to the second processor.

10. The floating vessel based system of claim 1, wherein the seismic source is located on the floating vessel, on a second source floating vessel 120ab, or towed from the floating vessel, or towed from the second source floating vessel.

11. The floating vessel based system of claim 1, comprising a waterproof housing having a hydrodynamic body providing horizontal and vertical profiles adapted to capture acoustic or seismic energy.

12. The floating vessel based system of claim 1, wherein the power supply is a DC voltage source having a range from 3 volts to 24 volts.

13. The floating vessel based system of claim 12, wherein the power supply is replaceable or rechargeable.

14. The floating vessel based system of claim 1, wherein the multidimensional marine seismic record is generated at sampling intervals from 0.05 milliseconds and 4 milliseconds.

15. The floating vessel based system of claim 1, wherein the floating vessel tows a plurality of non-stationary seismic nodes at a plurality of depths D1, D2, D3, below a water surface simultaneously.

16. The floating vessel based system of claim 1, comprising a plurality of seismic sources towed by the floating vessel.

17. The floating vessel based system of claim 1, comprising a water proof housing with a fastener for engaging the at least one rope.

18. The floating vessel based system of claim 17, wherein each of the analog to digital converters is connected to a seismic sensor, each analog to digital converter converting one of the analog signals to a digital value.

19. The floating vessel based system of claim 18, wherein the pluralities of seismic sensors are mounted on the water proof housing.

* * * * *